United States Patent [19]

Arhab

[11] Patent Number: 5,799,761

[45] Date of Patent: Sep. 1, 1998

[54] LOCK-UP CLUTCH AND HYDROKINETIC DEVICE COMPRISING THE SAME

[75] Inventor: Rabah Arhab, Pierrefitte, France

[73] Assignee: Valeo, Paris, France

[21] Appl. No.: 669,458

[22] PCT Filed: Nov. 3, 1995

[86] PCT No.: PCT/FR95/01441

§ 371 Date: Jul. 8, 1996

§ 102(e) Date: Jul. 8, 1996

[87] PCT Pub. No.: WO96/14525

PCT Pub. Date: May 17, 1996

[30] Foreign Application Priority Data

Nov. 8, 1994 [FR] France .................. 94 13363

[51] Int. Cl.⁶ .................. F16H 45/02

[52] U.S. Cl. .................. 192/3.29; 192/212

[58] Field of Search .................. 192/3.28, 3.29, 192/3.33, 212

[56] References Cited

U.S. PATENT DOCUMENTS 4,274,519 6/1981 Morota et al. .
4,890,706 1/1990 Miura et al. .
5,224,576 7/1993 Fujimoto .................. 192/3.28

FOREIGN PATENT DOCUMENTS 240166 10/1987 European Pat. Off. .
4400211 7/1994 Germany .
94-07058 3/1994 WIPO .

OTHER PUBLICATIONS

Patent Abstracts of Japan vol. 4 No. 77 (c–10304), Jun. 4, 1980 & JP A 55–041908 (Hinode Kinzoku Netsuren KK) Mar. 25, 1980.

*Primary Examiner*—Charles A. Marmor
*Assistant Examiner*—Saúl J. Rodriguez
*Attorney, Agent, or Firm*—Longacre & White

[57] ABSTRACT

A lock-up clutch (10) comprising a piston (12) axially movable relative to a fixed drive wall (13), friction means (14) between the piston and the drive wall (13), a driven wall (15) on the opposite side of the piston from the drive wall (13), and resilient damping means (16) acting circumferentially between the piston (12) and said driven wall (15). At least on a level with the resilient damping means (16), said driven wall (15) extends on the side of the resilient damping means (16) axially facing the piston (12) and is adjacent to said piston (12). The clutch is useful in hydrokinetic coupling devices, especially for motor vehicles.

9 Claims, 1 Drawing Sheet

LOCK-UP CLUTCH AND HYDROKINETIC DEVICE COMPRISING THE SAME

BACKGROUND OF THE INVENTION a) Field of the Invention

This invention relates to hydrokinetic coupling devices, especially for motor vehicles, which are equipped with a locking clutch commonly called a "lock-up" clutch, for coupling mechanically together in rotation their turbine wheel with their impeller wheel.

b) Description of Related Art

It is more particularly directed to the case where the said lock-up clutch includes, firstly, a piston which is mounted for axial movement with respect to an axially fixed driving wall, with friction means between it and the said driving wall for coupling it in rotation to the latter, and secondly, on the other side of the piston with respect to the driving wall, a driven wall which is adapted to be coupled in rotation to the turbine wheel of the hydrokinetic coupling device, and with resilient damping means interposed circumferentially between the said piston and the said driven wall.

This is the case, for example, in the document WO-A1-94/07058, in which various embodiments are proposed, especially as regards the first engagement zones which are part of a damper plate, and on which the resilient damping means bear circumferentially at their ends through their middle zone, and as regards the second engagement zones which are part of a guide ring on which the resilient damping means bear circumferentially at their ends through their lateral zones.

A common feature of all of these embodiments is that the damper plate, with which the second zones for engagement of the resilient damping means are associated, is constituted by the driven wall, to which the turbine wheel is fixed.

As a result, in line with at least these resilient damping means, the said driven wall lies spaced away from the piston, which is a disadvantage for the axial overall size of the assembly.

SUMMARY OF THE INVENTION

A main object of the invention is to provide a lock-up clutch of the said kind in which, by contrast, the driven wall extends at least in line with the resilient damping means on the side of the said resilient damping means that faces axially towards the piston, being adjacent to the said piston; it is also directed to any hydrokinetic coupling device including such a lock-up clutch.

Since, according to the invention, the driven wall lies as close as possible to the piston, the piston is itself as close as possible to the turbine wheel, and this leads to improved axial compactness of the assembly.

In practice, and in accordance with a feature of the invention, the piston is fixed in rotation to first engagement zones on which the resilient damping means bear circumferentially at their ends through their middle zone, defining, for example, the said first engagement zones by an integral U-shaped return portion, while the driven wall is fixed to second engagement zones on which the resilient damping means bear circumferentially at their ends through their lateral zones, defining, for example, the said second engagement zones by integral lugs which are substantially parallel to the axis of the assembly.

Thus, the piston has the advantage of remaining sealed, and it is the driven wall that carries the second zones for engagement with the resilient damping means, the said second engagement zones being flanked radially by the first engagement zones, which are therefore carried by the piston.

BRIEF DESCRIPTION OF THE DRAWINGS

The objects of the invention, their features and their advantages, will appear more clearly from the following description, by way of example and with reference to the attached diagrammatic drawings, in which.

DETAILED DESCRIPTION OF PREFERRED EMBODIMENT

Figure 1:
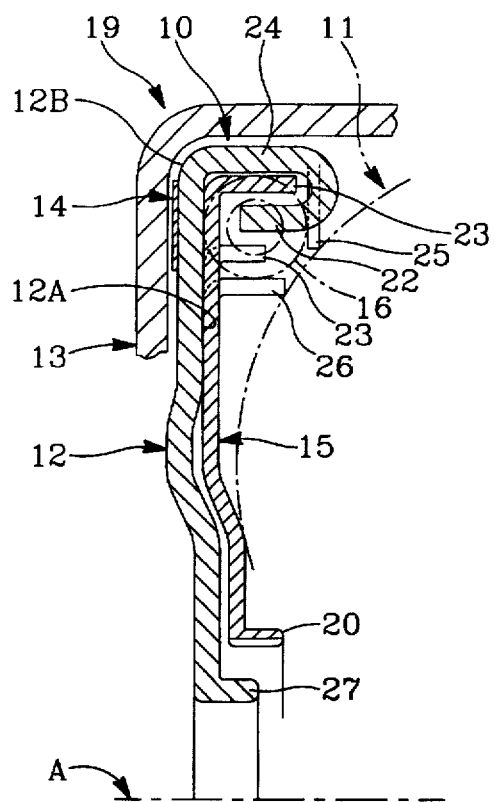
FIG. 1 is a half view in axial cross section of a lock-up clutch in accordance with the invention.

As shown in the drawings, these show generally a lock-up clutch 10, which is intended for equipping a hydrokinetic coupling device, not all of which is shown, for coupling together mechanically in rotation the turbine wheel 11 of the said hydrokinetic coupling device and its impeller wheel, and which comprises, firstly, a piston 12 which is mounted for axial movement with respect to an axially fixed driving wall 13, with friction means 14 between it and the said driving wall 13 for coupling it with the latter in rotation, and secondly, on the other side of the piston 12 with respect to the driving wall 13, a driven wall 15 which is coupled to the turbine wheel 11 for rotation with the latter, together with resilient damping means 16 interposed circumferentially between the piston 12 and the said driven wall 15.

In the drawings, the turbine wheel 11 is only shown diagrammatically, in phantom lines which represent a portion of its overall external contour.

The piston 12 extends generally transversely with respect to the axis A of the assembly, and the same is true for the driven wall 15.

The driving wall 13 is here a casing wall.

In practice it consists of the base wall of a cup-shaped casing shell 19 adapted to be mounted in rotation on a driving shaft, not shown, which is for example, where applied to a motor vehicle, the crankshaft of the engine.

The impeller wheel, not shown, of the hydrokinetic coupling device concerned, is fixed to the said driving wall 13 for rotation with it.

In this example, the friction means 14 interposed between the piston 12 and the driving wall 13 consist of a ring of friction material which is attached, for example by adhesive bonding, on the piston 12.

The resilient damping means 16 acting circumferentially between the piston 12 and the driven wall 15 consequently comprise, in this example, a plurality of springs of the coil spring type, which are distributed on a circle around the axis A of the assembly, and of which only one is shown, diagrammatically in phantom lines representing its transverse contour, in the drawings.

These springs may if desired be precurved.

In accordance with the invention, in line with, at least, one of the resilient damping means 16, the driven wall 15 lies on the side of the said resilient damping means 16 that faces axially towards the piston 12, and is adjacent to the piston 12.

The driven wall 15 is here in contact with the piston 12 over at least that part of its radial extent, towards the axis A of the assembly, that flanks the resilient damping means 16.

In this example the driven wall 15 is extended radially towards the axis A of the assembly, and, close to the latter, it is fixed to a hub 20 by means of which it is adapted to be mounted for sliding movement on a turbine hub not shown, which is fixed to the turbine wheel 11 and which is arranged to be mounted on a driven shaft, again not shown, which constitutes the input shaft of a gearbox in the case of application to a motor vehicle, for rotation therewith.

In accordance with the invention, the piston 12 is fixed with respect to engagement zones 22, which are here referred to as first engagement zones, for rotation with those zones, on which the resilient damping means 16 bear circumferentially at their ends through their middle zone, while the driven wall 15 is fixed in rotation to engagement zones 23, here referred to as second engagement zones, which flank the first engagement zones 22, radially in this example, and on which the resilient damping means 16 bear circumferentially at their ends through their lateral zones.

In this example, the piston 12 has at its outer periphery, that is to say at that one of its peripheries that has the larger diameter, an annular perpendicular flange portion 24 which extends substantially parallel to the axis A of the assembly, beyond the resilient damping means 16.

At its inner periphery, that is to say at that one of its peripheries that has the smaller diameter, the piston 12 has an annular sleeve portion 27, by means of which it is mounted axially and sealingly on a surface, not shown, which is fixed with respect to the turbine hub.

In FIG. 1, each of the first engagement zones 22 consists of a U-shaped return portion, which is integral with the perpendicular flange portion 24 of the latter and which extends substantially parallel to the axis A of the assembly, in the opposite axial direction to the said perpendicular flange portion 24, and therefore extends towards the ring which constitutes the friction means 14.

Similarly, the second engagement zones 23 are constituted by lugs which are integral with the driven wall 15, and which extend substantially parallel to the axis A of the assembly in the same direction as the perpendicular flange portion 24 of the piston 12, flanking the U-shaped return portions of the latter which constitute the first engagement zones 22.

For example, each of the lugs that constitute the radially innermost second engagement zones 23 is defined by a split in the driven wall 15, while each of the lugs that constitute the radially outermost second engagement zones 23 is defined in a perpendicular return portion of the said driven wall 15.

In this example, the resilient damping means 16 are adapted to make contact circumferentially, between the lugs constituting the second engagement zones 23 and the U-shaped return portions constituting the first engagement zones 22, with the perpendicular flange portion 24 of the piston 12, and more precisely with the inner periphery of the said perpendicular flange portion 24.

This perpendicular flange portion 24 thus ensures their external radial retention, that is to say their radial retention on the side opposed to the axis A of the assembly.

In this example, the springs constituting the resilient damping means 16 are lodged in slots, which are open on the side radially opposite to the axis A of the assembly and which are not visible in the drawings, with each of them being formed locally in the driven wall 15.

As a result, the resilient damping means 16 are also in contact with the piston 12, and therefore the latter also ensures their corresponding axial retention on the opposite side from the turbine wheel 11.

In order to resist the radial and axial friction forces to which it is thus subjected, the appropriate inner surface 12A of the piston 12, that is to say the surface of the piston 12 which faces towards the turbine wheel 11, is preferably hardened, for example by cyanide treatment.

In a variation, it is for example case hardened, or given a high frequency hardening treatment.

Preferably, and especially in the case of cyanide treatment, the outer surface 12E of the piston 12, that is to say that one of its surfaces which is located on the side opposite to the turbine wheel 11, is coppered, so that it too can remain sensitive to the corresponding treatment.

For the axial retention of the resilient damping means 16 on the same side as the turbine wheel 11, the piston 12 includes, in FIG. 1, at least one lug 25, which extends from its perpendicular flange portion 24 radially towards the axis A of the assembly, on the other side of the said resilient damping means 16 with respect to the driven wall 15, being in practice integral with the said perpendicular flange portion 24, from which it is formed for example by hot bending.

In addition to the foregoing, in order to provide internal radial retention of the resilient damping means 16, that is to say for their radial retention on the opposite side from the perpendicular flange portion 24 of the piston 12, the driven wall 15 includes, in FIG. 1, at least one lug 26 which extends substantially parallel to the axis A of the assembly in the same axial direction as the lugs constituting the second engagement zones 23, between the resilient damping means 16 and the axis A of the assembly, being made in practice integral with the said driven wall 15, like the said lugs.

In the assembly process, the driven wall 15 is first brought into axial contact with the piston 12 by engagement, on the U-shaped return portions of the latter that constitute the first engagement zones 22, of slots with which it is provided for receiving the springs that constitute the resilient damping means 16.

Relative rotation is then carried out between the driven wall 15 and the piston 12, so that its lugs which constitute the second engagement zones 23 come into radial flanking relationship with the first engagement zones 22.

Finally, the springs constituting the resilient damping means 16 are fitted, and the lugs 25 of the piston 12 are then bent back.

As will be noted, only a reduced number of components is employed in this case, and this is an advantage.

Figure 2:
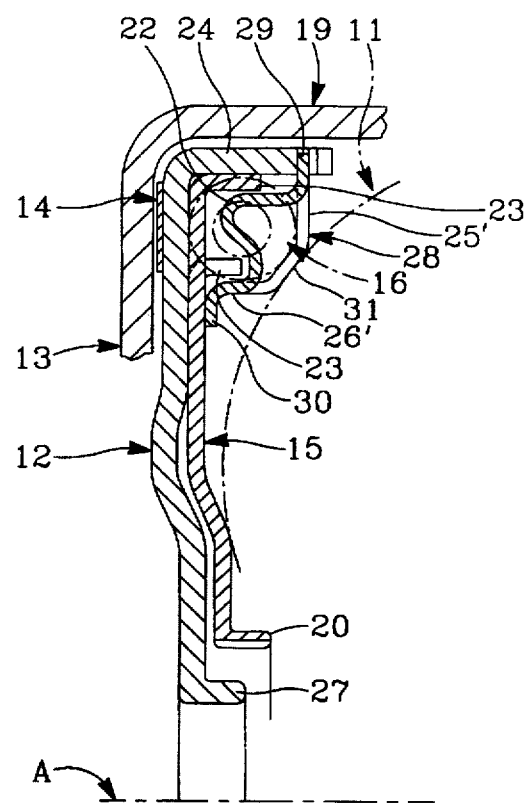
FIGS. 2 and 3 are half views in axial cross section, each of which, being similar to that in FIG. 1, relates, respectively, to another embodiment of the invention.

In FIG. 2, the first engagement zones 22 are defined by a closure member 28, which is a separate component from the piston 12 but which is mounted on the latter for rotation with it.

In this example, the said closure member 28 extends, at least partly, on the other side of the resilient damping means 16 with respect to the piston 12, generally from the perpendicular flange portion 24 of the piston 12 to the driven wall 15, meshing with the perpendicular flange portion 24 of the piston 12 through a set of teeth 29, and bearing on the driven wall 15 through a flange 30 which extends radially towards the axis A of the assembly.

Between two lateral portions 25', 26', one of which is substantially at right angles to the axis A of the assembly while the other is substantially parallel to the latter, and by means of which it contributes to both the axial and the internal radial retention of the resilient damping means 16, these lateral portions being on the same side as the turbine wheel 11 and taking the place of the lugs 25, 26 of the preceding embodiment, the closure member 28 includes a middle portion 31 which extends into the immediate vicinity of the turbine wheel 11, between the latter and the resilient damping means 16, and from which there are formed, from place to place by stamping, half-wave deformations which constitute the first engagement zones 22.

The first engagement zones 22 have the advantage that, by virtue of their serpentine profile, they offer an increased engagement surface for the resilient damping means 16.

They also enable the piston 12 to be simplified.

The driven wall 15 is itself simplified because the lugs 26 are omitted.

As to the middle portion 31 of the closure member 28, it has the advantage of providing a support for the resilient damping means 16.

During the assembly operation, the driven wall 15 is first brought into axial contact with the piston 12 as before.

Then, in succession, the springs constituting the resilient damping means 16 are fitted in position, followed by fitting of the closure member 28 by insertion of the teeth of the set of teeth 29 of the latter into the notches which are provided for this purpose on the perimeter of the perpendicular flange portion 24 of the piston 12, so as to provide a connection of the tenon and mortice type. Finally, material raised from the edges of the notches of the perpendicular flange portion 24 of the piston 12 is deformed on to the teeth of the set of teeth 29 of the closure member 28 by a seaming operation, which is preferably carried out hot.

The closure member 28 is now coupled to the piston 12, not only circumferentially in rotation by means of a tenon and mortice type coupling, but also axially by seaming.

It is now generally fixed with respect to the piston 12.

Figure 3:
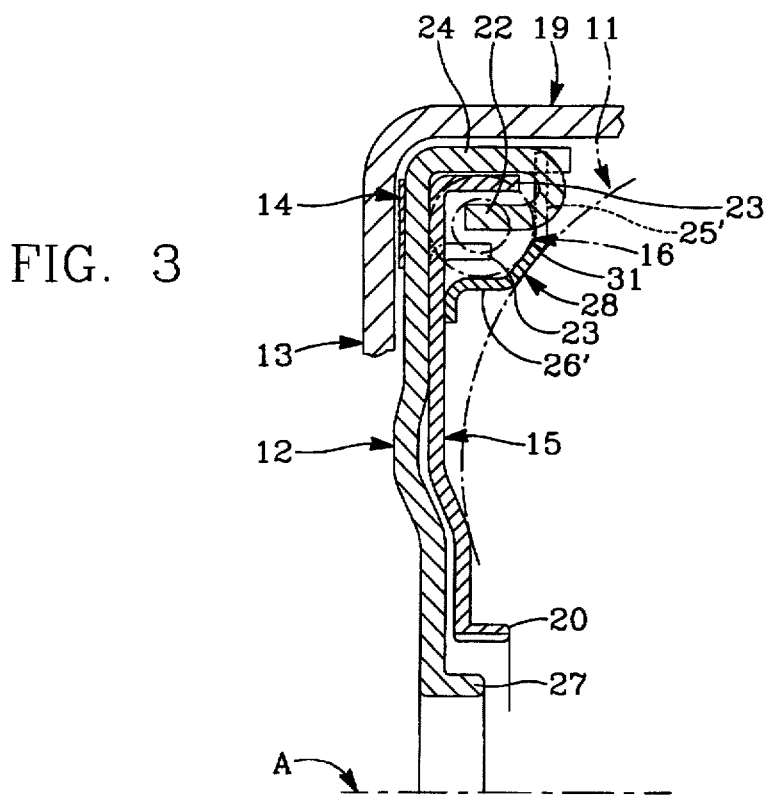

In FIG. 3, the closure member 28 only provides axial and radial retention of the resilient damping means 16 through its lateral portions 251, 261, the first engagement zones 22 being defined, as before, by a U-shaped return portion of the perpendicular flange portion 24 of the piston 12.

In the assembly operation, and as described with reference to FIG. 1, the driven wall 15 is first brought axially into contact with the piston 12, and a relative rotation of the said driven wall 15 and piston 12 is then carried out, this being followed by the fitting of the springs that constitute the resilient damping means 16.

Finally, the closure member 28 is fitted in place and seamed on to the piston 12 in the manner described with reference to FIG. 2.

As will be noted, because it carries the first engagement zones 22, or is fixed with respect to the latter, the piston 12 performs the function in all cases of a "damper plate" of the prior art; where the piston 12 carries the first engagement zones 22, the "damper plate" is somewhat fragmented in these first engagement zones 22.

As will also be noted, because it carries the second engagement zones 23, the driven wall 15 also performs the function in all cases of a "guide ring" of the prior art, this "guide ring" being somewhat fragmented in the said second engagement zones 23.

If desired, the driven wall 15 may have local depressions from place to place, to provide point contact with the piston 12.

It may also be fixed to the turbine wheel 11, for example by welding.

As to the ring that constitutes the friction means 14, it may also be carried on the driving shaft 13, for example by adhesive bonding.

The present invention is, moreover, not of course limited to the embodiments described and shown, but embraces all variants thereof and/or combinations of their various elements.

I claim:

1. A lock-up clutch comprising, firstly, a piston (12) which is mounted for axial movement with respect to an axially fixed driving wall (13), with friction means (14) between the piston (12) and the driving wall (13) for securing the piston (12) to the driving walls (13) for rotation therewith, and secondly, a driven wall (15) on a side of the piston (12) opposite from the driving wall (13), with resilient damping means (16) having a middle zone (23) being interposed circumferentially between the piston (12) and the driven wall (15), characterized in that the driven wall (15) extends at least radially in line with the resilient damping means (16) on the side of said resilient damping means (16) that faces axially towards the piston (12), being adjacent to the said piston (12), and in that the driven wall (15) is in contact with the piston (12) radially under the resilient means (16).

2. A lock-up clutch according to claim 1, characterized in that the piston (12) is fixed in rotation to first engagement zones (22), on which the resilient damping means (16) bear circumferentially at their ends through their middle zone, while the driven wall (15) is fixed in rotation to second engagement zones (23) on which the resilient damping means (16) bear circumferentially at their ends through their lateral zones, and in that each of the first engagement zones (22) is defined by a U-shaped return portion of the piston (12).

3. A lock-up clutch according to claim 2, characterized in that, for the axial retention of the resilient damping means (16), the piston (12) has at least one lug (25) which, being formed from a perpendicular flange portion (24), extends substantially radially towards the axis (A) of the assembly, on the other side of the resilient damping means (16) with respect to the driven wall (15).

4. A lock-up clutch according to claim 2, characterized in that, for the radial retention of the resilient damping means (16), the driven wall (15) has at least one lug (26), which extends substantially parallel to the axis (A) of the assembly between the said resilient damping means (16) and the axis (A).

5. A lock-up clutch according to claim 2, characterized in that the second engagement zones (23) are defined by lugs formed from the driven wall (15).

6. A lock-up clutch according to claim 1, characterized in that the piston (12) is fixed in rotation to first engagement zones (22), on which the resilient damping means (16) bear circumferentially at their ends through their middle zone, while the driven wall (15) is fixed in rotation to second engagement zones (23) on which the resilient damping means (16) bear circumferentially at their ends through their lateral zones, and in that the first engagement zones (22) are defined by a closure member (28), which is a separate component from the piston (12) but is mounted on the piston (12) for rotation with the piston (12).

7. A lock-up clutch according to claim 6, characterized in that the closure member (28), being disposed axially, at least partly, on the other side of the resilient damping means (16) with respect to the piston (12), extends generally from a perpendicular flange portion (24) of the piston (12) to the driven wall (15).

8. A lock-up clutch according to claim 7, characterized in that the closure member (28) has a middle portion (31), the first engagement zones (22) are defined by half-wave deformations formed from the middle portion (31) of the closure member (28).

9. A lock-up clutch according to claim 1, characterized in that, the resilient damping means (16) being in contact with the piston (12), the inner surface (12A) of the piston is cyanide hardened.

* * * * *